Oct. 13, 1936.                E. L. HORNING                2,057,525
                              ELECTRIC SWITCH
                           Filed Dec. 17, 1935
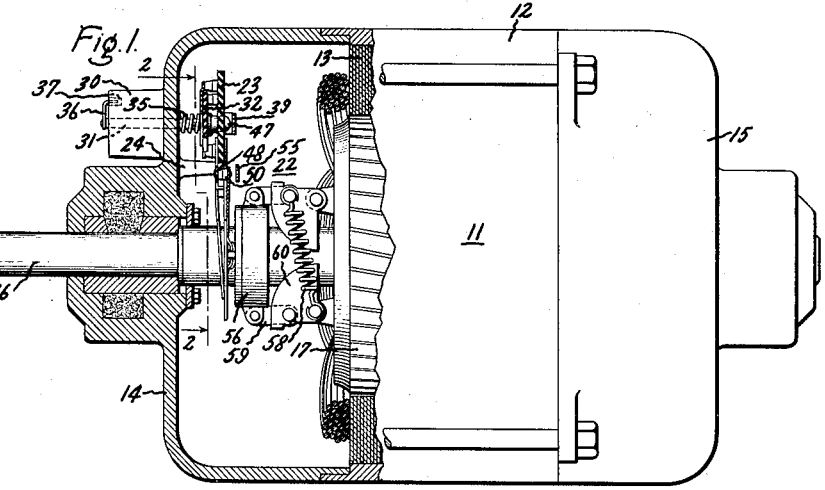
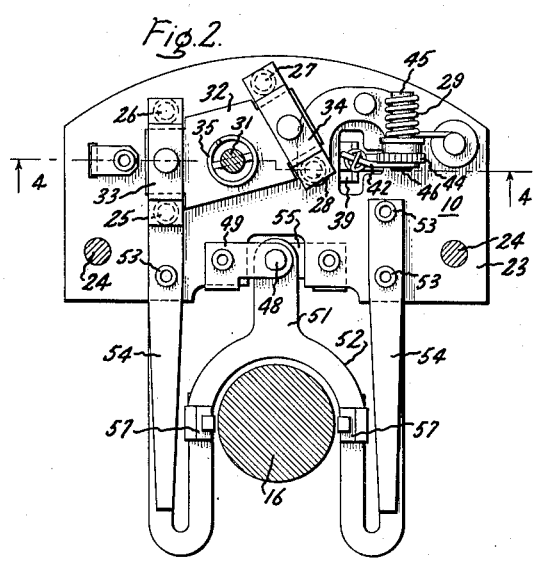
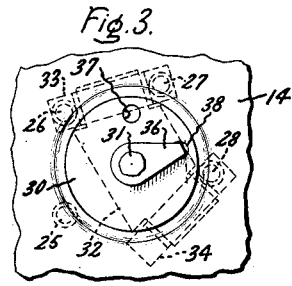
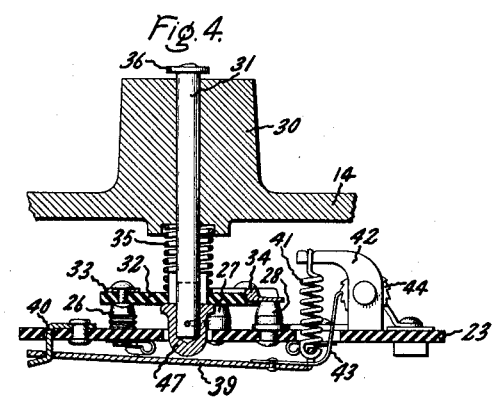
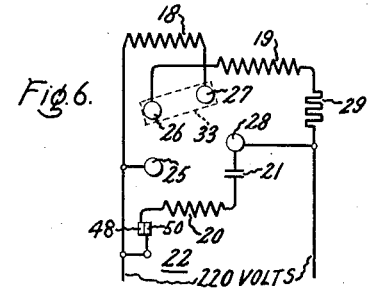
Inventor:
Edwin L. Horning,
Harry E. Dunham
His Attorney.

Patented Oct. 13, 1936

2,057,525

UNITED STATES PATENT OFFICE 2,057,525

ELECTRIC SWITCH

Edwin L. Horning, Fort Wayne, Ind., assignor to General Electric Company, a corporation of New York Application December 17, 1935, Serial No. 54,816

7 Claims. (Cl. 172—36)

My invention relates to electric switches, more particularly to multiple position electric switches for controlling the circuit connections of an electrical device such as an electric motor, and has for an object the provision of a simple, reliable and inexpensive device of this type.

It has heretofore been proposed to provide voltage changing switches for electric motors having a plurality of windings, the voltage-changing switch being arranged selectively to connect the windings in series or in parallel circuit relation with each other to adapt the motor for operation on different values of voltage. For example, when the motor is to be energized from a 110-volt source, the switch is operated to one position to connect the windings in parallel circuit relation and when the motor is to be energized from a 220-volt source, the switch is operated to a second position to connect the windings in series circuit relation with each other. Much is yet to be desired in a voltage-changing switch of this type which is simple in its construction and reliable in its operation and which may be mounted within the casing of the motor.

It has also been proposed hitherto to provide an overload responsive switch for protecting the motor windings against injury due to the flow of abnormal currents. I have found that it is desirable from the standpoint of economy and simplicity to combine in one unitary structure a voltage-changing switch and an overload protective device, and accordingly, it is a further object of my invention to provide a switch of this type which is manually operable between a plurality of closed circuit positions and which is automatically operable from either of its closed circuit positions to an open circuit position.

In carrying out my invention in one form, I provide an electric switch comprising a plurality of fixed contacts and cooperating switch means reciprocally movable between open and closed circuit positions and rotatable between predetermined positions to preselect certain of the fixed contacts for engagement upon operation of the switch means to closed circuit position. Means are provided for biasing the switch means for reciprocal movement to the closed circuit position, and locking means are provided for preventing movement of the switch means to the closed circuit position except when the switch means is in one of its predetermined positions and for locking the switch means against rotation when it is in its closed circuit position. The locking means is arranged to permit movement of the switch means to its open circuit position at will, and current responsive means are provided for operating the switch means to the open circuit position in response to a predetermined flow of current through the switch means in either of its predetermined positions.

More specifically, I provide a combined voltage-changing and automatic overload switch for an electric motor having a plurality of running windings adapted selectively to be connected in series or parallel circuit relation. The switch comprises a base plate supported in spaced relation with the end shield of the motor casing, a plurality of fixed contacts mounted on the base plate being connected to the running windings of the motor. Journaled in the end shield for reciprocal and rotary movement, is an operating shaft, one end of which carries the movable switch means and the other end of which is provided with a hooked handle portion. Means are provided for biasing the shaft and the switch means for reciprocal movement to a closed circuit position, the hooked end of the shaft preventing such reciprocal movement except when the shaft and the switch means are in predetermined positions, the hooked end then cooperating with suitable recesses formed in the end shield. The switch means in one of its predetermined positions engages certain of the fixed contacts to connect the motor windings in series relation with each other, and in another of its positions engages certain others of the fixed contacts to connect the motor windings in parallel circuit relation. Supported on the base plate, I provide current responsive means arranged to be energized in accordance with the current flowing through the motor windings and adapted upon the occurrence of predetermined current conditions, to operate the switch means to its open circuit position.

For a more complete understanding of my invention, reference should now be had to the drawing in which Fig. 1 is an elevational view, partly in section, of an electric motor having applied thereto a combined voltage-changing and overload protective switch embodying my invention; Fig. 2 is a fragmentary end view partly in section, the section being taken along the line 2—2 of Fig. 1; Fig. 3 is a fragmentary end view of a portion of the end shield of the motor with the operating handle of the switch extending therethrough; Fig. 4 is a fragmentary sectional view of the switch and the end shield, the section being taken along a line indicated by the broken line 4—4 in Fig. 2; and Figs. 5 and 6 are circuit diagrams illustrating somewhat diagrammatically the manner in which the switch operates to control the circuit connections of the motor windings.

Referring now to the drawing, I have shown my invention in one form as applied to a combined voltage changing and protective switch 10 for an electric motor 11. The electric motor comprises a casing which includes a frame 12 for supporting the stationary magnetic structure 13 of the motor and a pair of end shields 14 and 15 which rotatably support a shaft 16 on which the rotor 17 of the motor is mounted. For purposes of illustration, I have shown a capacitor type motor having a plurality of running windings 18 and 19 (Figs. 5 and 6) and a starting winding 20 arranged to be connected in series with a suitable capacitor 21 by a speed responsive switch 22, preferably of a well-known centrifugal type, as shown in Fig. 1.

As shown best in Figs. 1 and 2, the switch 10 is arranged within the motor casing and comprises a base plate 23 preferably formed of insulating material, which is supported in spaced relation with the end shield 14 by means of suitable screws, not shown, which engage supporting studs 24 extending outwardly from the end shield 14. Mounted on the base plate 23, I provide a plurality of fixed contacts 25, 26, 27 and 28, the contacts 25 and 27 being connected to the respective ends of the winding 18, as shown best in Figs. 5 and 6, the contact 26 being connected to one end of the winding 19, and the contact 28 being connected to the other end of the winding 19 through a suitable heater coil 29, the purpose of which will be more fully described hereinafter.

Adjacent the base plate 23, the end shield 14 is provided on its exterior surface with a projecting portion 30 in which an operating shaft 31 is journaled for reciprocal and rotary movement. Supported by the inner end of the shaft 31, I provide movable switch means comprising a movable plate 32 which is preferably formed of insulating material and which carries a pair of bridging members 33 and 34. As shown, a spring 35 surrounds the shaft 31 and normally biases the shaft and the movable switch means to the closed circuit position shown, in which the bridging members 33 and 34 engage certain of the fixed contacts 25 to 28 inclusive.

When the movable switch means is in the position shown best in Figs. 2 and 6, it will be seen that the bridging member 33 completes a circuit between the fixed contacts 25 and 26, and the bridging member 34 completes a circuit between the fixed contacts 27 and 28 so as to connect the windings 18 and 19 in parallel circuit relation with each other. Likewise, it will be seen that when the movable switch means is in the position shown in Figs. 3 and 6, the bridging member 33 completes a circuit between the fixed contacts 26 and 27 to connect the windings 8 and 9 in series circuit relation with each other, the bridging member 34 being ineffective to complete a circuit between any of the fixed contacts in this position of the switch. It will therefore be seen that the movable switch means is rotatable between predetermined positions to select certain of the fixed contacts for engagement so as to connect the motor windings in parallel circuit relation or in series circuit relation with each other.

As shown best in Figs. 1 and 3, the end of the shaft 31 opposite from the movable switch means is provided with a hook-shaped handle 36, and the extending portion 30 of the end shield 14 is provided with a pair of spaced apart recesses 37 and 38. When the end of the handle 36 is in alignment with the recess 37, it will be seen that the biasing spring 35 is effective to move the switch means and the shaft to the closed circuit position shown in Figs. 1, 2 and 5, the recess 37 being so located as to provide for proper alignment of the bridging members 33 and 34 with the fixed contacts 26 to 28 inclusive.

Likewise it will be apparent that when the shaft 31 is moved in a left-hand direction, as viewed in Fig. 1, to withdraw the end of the handle 36 from the aperture 37, the movable switch means will be disengaged from the fixed contacts, and accordingly, the energizing circuits for the windings 18 and 19 will be interrupted. If the handle 36 is now moved to a position intermediate the recesses 37 and 38 so as to rotate the shaft 31 and the movable switch means carried thereby from the position predetermined by the recess 37, it will be seen that the end of the handle 36 will engage the portion 30 of the end shield 14 and will prevent operation of the shaft 31 and the movable switch means to the closed circuit position by the spring 35 until the handle 36 is brought into alignment with the recess 38. Accordingly, the handle 36 and the recesses 37 and 38 provide locking means for preventing operation of the movable switch means to its closed circuit position except when the movable switch means is in one or the other of the positions predetermined by the recesses 37 and 38. It will likewise be apparent that the cooperating relation of the handle 36 and the recesses 37 and 38 is such as to prevent rotation of the movable switch means except when the movable switch means is in its open circuit position, the hooked end of the handle 36 being sufficiently long to prevent such rotation until after the movable switch means has been moved out of engagement with all of the fixed contacts.

In order to operate the movable switch means to the open circuit position automatically in response to predetermined current conditions in the windings, I provide current responsive tripping means including a tripping lever 39, Fig. 4, one end of which pivotally engages a supporting finger 40 extending outwardly from the plate 23 and the other end of which is secured to a tripping spring 41, the opposite end of the spring 41 being supported on an arm 42 extending outwardly from the plate 23. As shown, a latch finger 43 which is secured to one end of the lever 39 normally engages a ratchet wheel 44 to restrain the lever 39 against movement by the spring 41. This ratchet wheel 44 constitutes the movable element of a suitable thermal device. Although any suitable type of thermal device may be employed, I have shown for purposes of illustration a fusible solder device of a well known type, comprising a hollow cylindrical sleeve 45 which extends within the above referred to heading winding 29 and is journaled on a stationary shaft 46. The ratchet wheel 44 is formed integrally with the sleeve 45, as shown, and the wheel 44 and the sleeve 45 are restrained against rotation relative to the shaft 46 by a body of fusible solder. Upon the occurrence of predetermined current conditions, however, the heat generated by the flow of current through the heating winding 29 causes the solder to fuse and thus release the sleeve 45 and the ratchet wheel 44 for rotation in accordance with the bias exerted by the spring 41. Upon release of the ratchet wheel 44, it will be seen that the lever 39 is moved in a counterclockwise direction about its pivot, as viewed in Fig. 4, by the spring 41, an intermediate portion of the lever 39 engaging a buffer member 47 secured to the end of the shaft 31 so as to operate the shaft 31 and the movable switch means to the open circuit position against the bias of the spring 35. It will thus be seen that the movable switch means is manually movable to a plurality of selected closed circuit positions to control the connections of the windings 18 and 19, and is automatically movable from either of its closed circuit positions to an open circuit position upon the occurrence of predetermined current conditions in the motor windings.

As shown best in Figs. 1 and 2, the plate 23 also supports the movable and stationary contacts of the centrifugal device 22, the stationary contact 48 being carried by a supporting finger 49 and the movable contact 50 (Fig. 1) being carried by a finger 51 which extends outwardly from a bifurcated reversely bent resilient member 52, between the legs of which nests the shaft 16, the reversely bent ends of the member 52 being secured to the plate 23, as by suitable rivets 53. As shown, a pair of spring fingers 54 are provided which normally engage the resilient member 52 to bias the movable contact 50 to an open circuit position in which it is engaged by a stop member 55. When the motor is at a standstill, however, the contacts 50 and 48 are maintained in the closed circuit position, as shown in Fig. 1, by a slidable collar 56 which engages suitable buffer members 57 on the bifurcated resilient member 52.

As will be apparent to those skilled in the art, the collar 56 is retained in the position shown in the drawing so long as the motor is at a standstill or is operating at low speeds by a plurality of springs 58 (only one of which is shown), which springs normally bias suitable operating toggles to the locked position shown, each toggle comprising a link 59 pivotally secured to the collar 56 and a weighted link 60 pivotally secured to the rotor 17. As the speed of the rotor increases, it will be seen that the weights 60 will move outwardly due to the centrifugal force exerted, and will break the toggles against the force of the springs 58 so as to move the collar 56 in a right-hand direction, as viewed in Fig. 1, and thereby release the movable contact 50 for operation to the open circuit position.

Referring now to Fig. 5, it will be assumed that the motor is to be connected for energization from a 110-volt source, and accordingly, the handle 36 is brought into alignment with the recess 37 so as to permit operation of the movable switch means to the closed circuit position, the bridging members 33 and 34 being in the position shown in Fig. 5. Since the motor is at a standstill, the contacts 48 and 50 of the centrifugal device 22 will be in engagement, as shown, and upon closure of a suitable line switch (not shown), the starting winding 20 and the running windings 18 and 19 will be energized in parallel circuit relation with each other, the heating winding 29 being traversed by the current through the winding 19. As the motor comes up to speed, the centrifugal device 22 will operate as above described to open the circuit to the starting winding 20 and the motor will thereafter continue to operate with the windings 18 and 19 connected in parallel circuit relation. If it is now assumed that the load on the motor increases so that the current through the winding 19 increases to a predetermined value, it will be apparent that the heating winding 29 will be heated so as to cause release of the tripping member 39 as above described, and accordingly, the bridging members 33 and 34 will be moved out of engagement with the fixed contacts 25 to 28 inclusive, thereby deenergizing the windings 18 and 19. As soon as the heating winding 29 has cooled sufficiently to permit the solder in the thermal device to solidify and thus secure the ratchet wheel 44 against rotation, it will be apparent that the bridging members 33 and 34 may be returned to the closed circuit position by reciprocally moving the shaft 31 so as to return the tripipng member 39 to the latched position shown, against the force of the spring 41.

When it is desired to operate the motor from a 220-volt source, the shaft 31 is moved in a left-hand direction, as viewed in Fig. 1, to the open circuit position to disengage the bridging members 33 and 34 from the fixed contacts and to withdraw the end of the handle 36 from the recess 37. The handle 36 may then be rotated until the end of the handle is in alignment with the recess 38, in which position the spring 35 is effective to operate the shaft 31 to the closed circuit position and thereby engage the bridging member 33 with the fixed contacts 26 and 27, as shown in Fig. 6.

The motor may now be started by closing a suitable line switch, as described above, and since the heating winding 29 is connected in series circuit relation with the running winding 19, it will be seen that the thermal device is effective in this position of the switch to interrupt the energizing circuit of the windings 18 and 19 in the same manner as described in connection with Fig. 5.

While I have shown a particular embodiment of my invention, it will be understood, of course, that I do not wish to be limited thereto since many modifications may be made, and I therefore contemplate by the appended claims to cover any such modifications as fall within the true spirit and scope of my invention.

What I claim as new and desire to secure by Letters Patent of the United States is:

1. An electric switch comprising a plurality of fixed contacts, switch means reciprocally movable with respect to said fixed contacts between open and closed circuit positions and rotatable with respect to said contacts between predetermined positions to preselect certain of said contacts for engagement upon operation of said switch means to said closed circuit position, means biasing said switch means for reciprocal movement to said closed circuit position, means for operating said switch means to said open circuit position and for rotating said switch means, locking means for restraining said switch means against movement in accordance with the bias thereon when said switch means is in other than said predetermined positions and for restraining said switch means against rotation when in said closed circuit position, and means responsive to the current flowing through said switch means in either of said predetermined positions for reciprocally operating said switch means to said open circuit position against the force exerted by said biasing means.

2. An electric switch comprising a plurality of fixed contacts, switch means reciprocally movable with respect to said fixed contacts between open and closed circuit positions and rotatable with respect to said contacts between predetermined positions to preselect certain of said contacts for engagement upon operation of said switch means to said closed circuit position, means biasing said switch means for reciprocal movement to said closed circuit position, means for operating said switch means to said open circuit position and for rotating said switch means, locking means for restraining said switch means against movement in accordance with the bias thereon when said switch means is in other than said predetermined positions and for restraining said switch means against rotation when in said closed circuit position, tripping means normally biased from one position to a second position for operating said switch means to said open circuit position against the force exerted by said biasing means, latching means for normally restraining said tripping means in said one position, and thermal means responsive to the current flowing through said switch means for releasing said latching means whereupon said tripping means operates said switch means to said open circuit position.

3. An electric switch comprising a plurality of fixed contacts, switch means reciprocally movable with respect to said contacts between open and closed circuit positions and rotatable with respect to said contacts between predetermined positions to preselect certain of said contacts for engagement upon movement of said switch means to said closed circuit position, a supporting member, means for operating said switch means including an operating shaft journaled in said supporting member for reciprocal and rotary movement, means biasing said shaft and said switch means for reciprocal movement to said closed circuit position, locking means associated with said shaft and said supporting member for restraining said shaft against movement to said closed circuit position when said switch means is in other than said predetermined positions and for restraining said shaft against rotation when said switch means is in said closed circuit position, and automatic means responsive to the current flowing through said switch means in either of said predetermined positions for reciprocally operating said switch means to said open circuit position against the force exerted by said biasing means.

4. An electric switch comprising a base plate formed of insulating material, a plurality of fixed contacts mounted on said plate, switch means reciprocally movable with respect to said plate between open and closed circuit positions and rotatable between predetermined positions to preselect certain of said contacts for engagement upon operation of said switch means to said closed circuit position, means biasing said switch means for reciprocal movement to said closed circuit position, means for operating said switch means to said open circuit position and for rotating said switch means, locking means for restraining said switch means against movement in accordance with its bias when in other than said predetermined positions and for restraining said switch means against rotation when in said closed circuit position, and thermal means supported on said plate for operating said switch means to said open circuit position in response to a predetermined flow of current through said switch means in either of said predetermined positions.

5. An electric switch comprising a support, a base plate formed of insulating material mounted in spaced relation with said support, a plurality of fixed contacts carried by said base plate, switch means reciprocably movable with respect to said plate between open and closed circuit positions and rotatable between predetermined positions to preselect certain of said contacts for engagement upon operation of said switch means to said closed circuit position, an operating shaft for said switch means journaled in said support for reciprocal and longitudinal movement, a handle secured to an end of said shaft adjacent said support, said support including a portion arranged to engage said handle to prevent movement of said shaft and said switch means to said closed circuit position except when in said predetermined positions, means for biasing said switch means to said closed circuit position when in said predetermined positions, and current responsive means supported on said base plate for operating said switch means to said open circuit position against said bias in response to a predetermined flow of current through said switch means.

6. In combination with an electric motor having a plurality of windings adapted selectively to be connected in series or parallel circuit relation with each other and a casing for said windings, a voltage-changing switch mounted within said casing comprising a base plate supported in spaced relation with a wall of said casing, a plurality of fixed contacts connected to said windings, switch means reciprocal between open and closed circuit positions and rotatable between predetermined positions to preselect certain of said contacts for engagement, said switch means upon movement to said closed circuit position in one of said predetermined positions connecting said windings in series through certain of said fixed contacts and in another of said predetermined positions connecting said windings in parallel through certain others of said fixed contacts, an operating shaft extending through and journaled in said wall for reciprocal and rotary movement to operate said switch means, said shaft having a hooked end external to said casing, and said casing wall having a plurality of recesses adjacent said hooked end, and means for biasing said shaft and said switch means for movement to said closed circuit position when said hooked end is in alignment with said recesses, said recesses corresponding to said predetermined positions, said hooked end locking said shaft against rotation between said predetermined positions except when in said open circuit position and preventing movement thereof to said closed circuit position in accordance with said biasing means except when in said predetermined positions.

7. In combination with an electric motor having a plurality of windings adapted selectively to be connected in series or in parallel circuit relation with each other and a casing for said windings including an end shield, a voltage-changing switch within said casing comprising a base plate supported in spaced relation to said end shield, a plurality of fixed contacts on said base plate connected to said windings, switch means reciprocal between open and closed circuit positions and rotatable between predetermined positions to preselect certain of said contacts for engagement, said switch means upon movement to said closed circuit position in one of said predetermined positions engaging certain of said contacts to connect said windings in series and in another of said predetermined positions engaging certain others of said fixed contacts to connect said windings in parallel, an operating shaft for said switch means journaled in said end shield for reciprocal and rotary movement, an end of said shaft extending externally of said motor casing, locking means associated with said end of said shaft and said end shield for restraining said switch means against rotation except when in said open circuit position and for preventing movement of said switch means to said closed circuit position except when in said predetermined positions, means biasing said switch means to said closed circuit position and means supported on said base plate responsive to the current flowing in said windings when connected in either parallel or series circuit relation for operating said switch means to said open circuit position against the force exerted by said biasing means.

EDWIN L. HORNING.